United States Patent [19]
Togai et al.

[11] Patent Number: 5,364,321
[45] Date of Patent: Nov. 15, 1994

[54] CONTROL DEVICE FOR INTERNAL COMBUSTION ENGINE AND A CONTINUOUSLY VARIABLE TRANSMISSION

[75] Inventors: Kazuhide Togai, Takatsuki; Takashi Takatsuka, Kyoto; Makoto Shimada, Okazaki; Junji Kawai, Anjo; Kazuya Hayafune, Okazaki, all of Japan

[73] Assignee: Mitsubishi Jidosha Kogyo Kabushiki Kaisha, Tokyo, Japan

[21] Appl. No.: 938,151

[22] PCT Filed: Apr. 2, 1992

[86] PCT No.: PCT/JP92/00407
§ 371 Date: Feb. 2, 1993
§ 102(e) Date: Feb. 2, 1993

[30] Foreign Application Priority Data
Apr. 2, 1991 [JP] Japan .................. 3-070131

[51] Int. Cl.$^5$ ............................ F16H 59/14
[52] U.S. Cl. ........................ 477/42; 477/904
[58] Field of Search ......................... 74/859

[56] References Cited
U.S. PATENT DOCUMENTS

| | | | |
|---|---|---|---|
| 4,505,169 | 3/1985 | Ganoung | 74/858 |
| 4,515,040 | 5/1985 | Takeuchi et al. | 74/866 |
| 4,720,793 | 1/1988 | Watanabe et al. | 364/424.1 |
| 5,046,177 | 9/1991 | Vahabzadeh | 364/424.1 |
| 5,050,455 | 9/1991 | Yamashita et al. | 74/866 |
| 5,231,582 | 7/1993 | Takahashi et al. | 364/424.1 |

FOREIGN PATENT DOCUMENTS

| | | |
|---|---|---|
| 61-171618 | 8/1986 | Japan . |
| 61-232926 | 10/1986 | Japan . |
| 1-56238 | 3/1989 | Japan . |
| 1-60440 | 3/1989 | Japan . |

Primary Examiner—Dirk Wright

[57] ABSTRACT

A control device for an internal combustion engine and a continuously variable transmission of a vehicle according to the present invention comprises the continuously variable transmission disposed between the internal combustion engine and driving wheels and enables controlling the output of the internal combustion engine. In particular, objective driving torque Tet is set according to driving torque Td applied to a vehicle, driving torque correcting amount $T_{IV}$ which serves as a first running resistance of the vehicle according to vehicle acceleration, transmission torque fluctuation correcting amount Tcv which serves as a second running resistance due to being consumed in the transmission operation mode of the continuously variable transmission, and vehicle body correcting torque Tv, which is necessary for eliminating a deviation Δv between an objective vehicle speed Vt and an actual vehicle speed Vc, required for eliminating this deviation Δv to control the output of the internal combustion engine with this objective driving torque. Accordingly, the internal combustion engine can be controlled with the output corresponding to a value of the objective driving torque Tet set by selectively using an optimum torque correcting amount depending on driving conditions. This results in elimination of slip of a transmission steel belt caused by excessive output and shock in the transmission operation.

7 Claims, 11 Drawing Sheets

CONTROL DEVICE FOR INTERNAL COMBUSTION ENGINE AND A CONTINUOUSLY VARIABLE TRANSMISSION

TECHNICAL FIELD

This invention relates to a control device for an internal combustion engine and a continuously variable transmission. The control device is connected to the continuously variable transmission disposed between the internal combustion engine and driving wheels, and changes and controls a transmission ratio of the continuously variable transmission at a transmission ratio changing speed suitable for driving conditions of the vehicle while controlling an output of the internal combustion engine.

DESCRIPTION OF RELATED ART

Generally, engine output (hereinafter, referred merely as "output") of an internal combustion engine (hereinafter, referred merely as an engine) mounted on a vehicle is mechanically controlled by a throttle device coupled to a driver-operable member such as an accelerator pedal and a throttle lever (which are representatively referred as accelerator pedal hereinafter) through an accelerator cable.

The accelerator pedal and the throttle device cooperate with each other such that the displacement corresponding to a stepping amount of the accelerator pedal is transmitted to the throttle device and a throttle valve in the device is actuated at this displacement (stepping amount). Unfortunately, excessive output may be generated due to careless driving and lack of skill of a driver. Consequently a vehicle may slide on starting, slip on the icy ground, and skid (slip) at a sudden acceleration.

Accordingly, methods have been proposed such as a dual throttle valve method where a main throttle valve and a sub-throttle valve are arranged in the throttle device. The sub-throttle valve is electronically controlled and a traction control (power control) method utilizing the so called drive-by-wire method is used. In this method, the accelerator cable is not disposed between the accelerator pedal and the throttle valve, and an opening of the accelerator pedal is detected by using a sensor such as a potentiometer. The throttle valve is then operated by a stepping motor or the like based on output of the sensor.

In the traction control method of the type described, an ECU (engine control unit) generally calculates an optimum opening (i.e., target engine output) for the sub-throttle valve and the main throttle valve in accordance with the data (1) representative of the rotation condition of the front and rear wheels and (2) a step amount for the accelerator pedal. The ECU controls a driving torque of the wheels in a range not to cause the undesirable skid.

Information regarding the required output of the engine is properly set in accordance with, for example, the opening of the accelerator pedal. As mentioned above, the ECU calculates and sets the required output of the engine when using the traction control method for drivingly controlling the sub-throttle valve and the main throttle valve so as to obtain the required output. In this event, it is preferable to carry out the calculation of the required output with respect to an actual torque under current engine conditions. More specifically, by calculating a deviation between a required torque and the actual torque and by carrying out a real-time control to eliminate the deviation, it is possible to prevent an over-control and poor response of the control device.

While the actual torque of the engine can be detected by a bench test using a chassis dynamometer, it is difficult in practice to mount it on a vehicle due to the weight, size, and costs of the device. Plus there is a serious defect that output (energy) loss is inevitably caused.

Accordingly, it is assumed that precision of the output control can be improved by calculating the actual torque in accordance with intake air flow information by using a conventional control system.

One power transmission method for transmitting output torque of the engine to wheels is variable transmission. As one such transmission, a continuously variable transmission (CVT) can continuously change the transmission ratio by using a steel belt and pulleys, and can increase or decrease a transmission ratio changing speed depending on a hydraulic value supplied to an hydraulic actuator.

In the continuously variable transmission of the type described, the transmission ratio changing speed, is calculated so as to eliminate a transmission ratio deviation between an objective transmission ratio which is calculated in accordance with the driving conditions and an actual transmission ratio. The hydraulic actuator of the continuously variable transmission is controlled in order to obtain the transmission ratio changing speed.

Problems to be solved by the present invention are as follows.

When the continuously variable transmission CVT and a cruise control system are mounted on a conventional vehicle, the following problems are caused. That is, when the transmission ratio of the continuously variable transmission CVT is changed at a relatively low speed, the torque on the drive shaft is smoothly changed. On the other hand, when a deviation between the target transmission ratio and the actual transmission ratio is relatively large, the transmission ratio has to be changed rapidly and extensively. However, the continuously variable transmission CVT consumes operational torque, and the moment of inertia of pulleys is relatively large, which adversely affects acceleration of the vehicle, causing undesired excessive shock during the transmission operation. In addition, excessive torque of the engine may result in slide of a steel belt. Accordingly, it is disadvantageous in that the vehicle speed may be varied on applying (engine brake at a downhill road or on operating the cruise control due to shocks during the transmission operation of the continuously variable transmission CVT even when the engine output is constant and the load is constant.

SUMMARY OF THE INVENTION

An object of the present invention is to provide a control device for an internal combustion engine and a continuously variable transmission which can control a preset vehicle speed without any fluctuation thereof when the transmission ratio of the continuously variable transmission is changed.

According to the present invention for controlling both an internal combustion engine and a continuously variable transmission, the control device for an internal combustion engine and a continuously variable transmission comprises: driving torque detecting means for detecting driving torque applied to a vehicle; acceleration detecting means for detecting actual acceleration of the vehicle; driving torque correcting amount setting means for setting a driving torque correcting amount as a first running resistance of the vehicle in accordance with the acceleration detected by the acceleration detecting means; transmission speed ratio changing speed detecting means for detecting transmission ratio changing speed which is a changing rate of the transmission ratio of the continuously variable transmission; transmission torque fluctuation correcting amount setting means for setting a transmission torque fluctuation correcting amount which corresponds to torque (i.e. a second running resistance) consumed for the transmission operation of the continuously variable transmission in accordance with the transmission ratio changing speed detected by the transmission ratio changing speed detecting means; vehicle speed detecting means for detecting an actual vehicle speed of the vehicle; a vehicle speed correcting torque setting means for setting vehicle speed correcting torque, which is necessary for eliminating a deviation between an objective vehicle speed and the actual vehicle speed detected by said vehicle speed detecting means; objective driving torque setting means for setting objective driving torque in accordance with the driving torque detected by the driving torque detecting means, the driving torque correcting amount set by the driving torque correcting amount setting means, the transmission torque fluctuation correcting amount set the transmission torque fluctuation correcting amount setting means, and the vehicle speed correcting torque set by the vehicle speed correcting torque setting means; and output controlling means for controlling output of the internal combustion engine in accordance with the objective driving torque set by the objective driving torque setting means.

Thus, the objective driving torque is set in accordance with the driving torque, the driving torque correcting amount, the transmission torque fluctuation correcting amount, and the vehicle speed correcting torque. In addition, the output of the internal combustion engine may be controlled by means of the objective driving torque. Accordingly, the objective driving torque can be set in consideration with the optimum torque correcting amount depending on the driving conditions. It is possible to control the internal combustion engine at optimum output for the value. Further, it is possible to eliminate slip of the steel belt caused by excessive output and shocks during the transmission operation and, in turn, to improve driving feelings.

DETAILED DESCRIPTION OF THE PREFERRED EMBODIMENT

Figure 1:
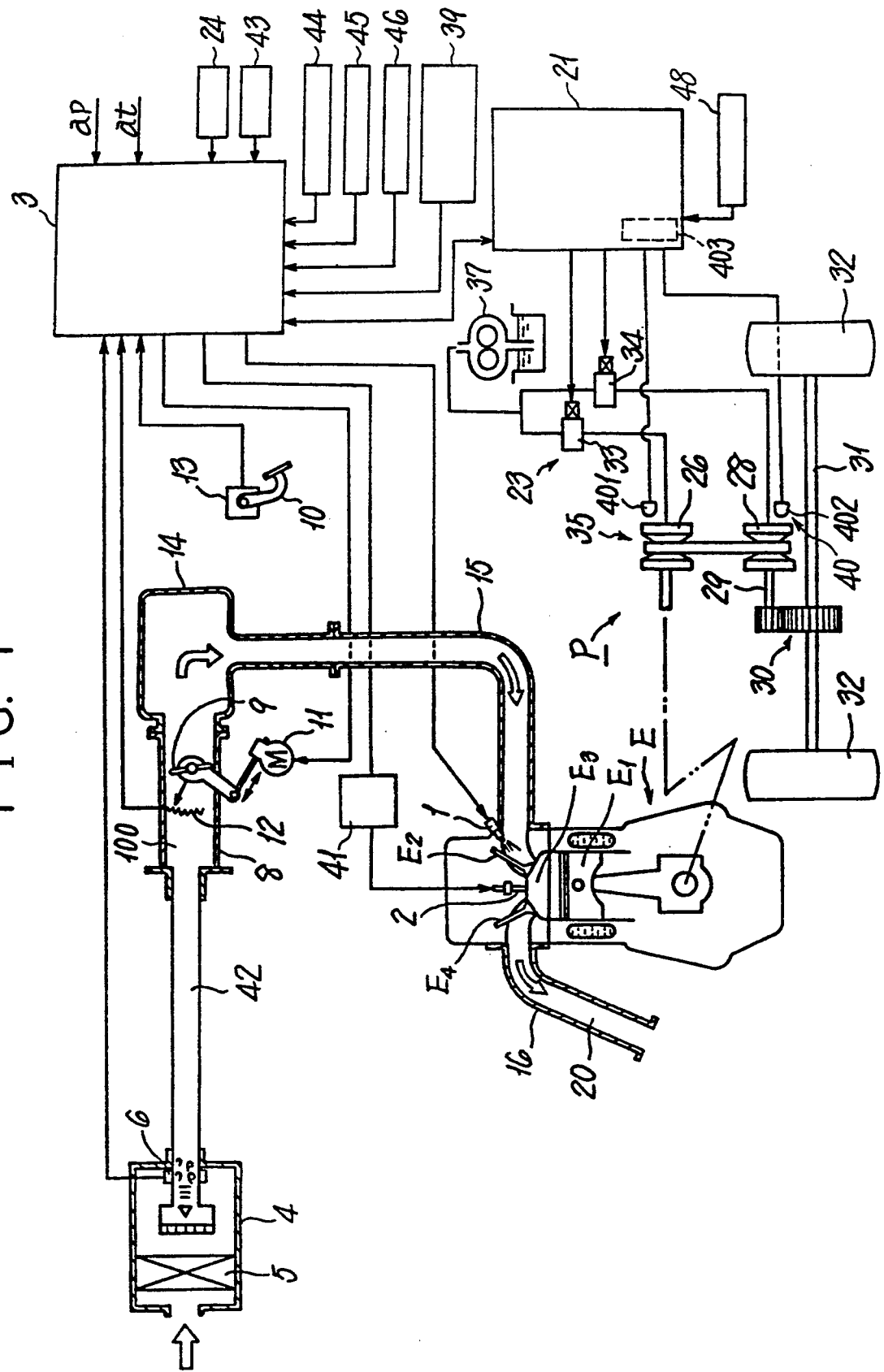
FIG. 1 is a whole structural diagram of a control device for an internal combustion engine and a continuously variable transmission according to one embodiment of the present invention.
Figure 2:
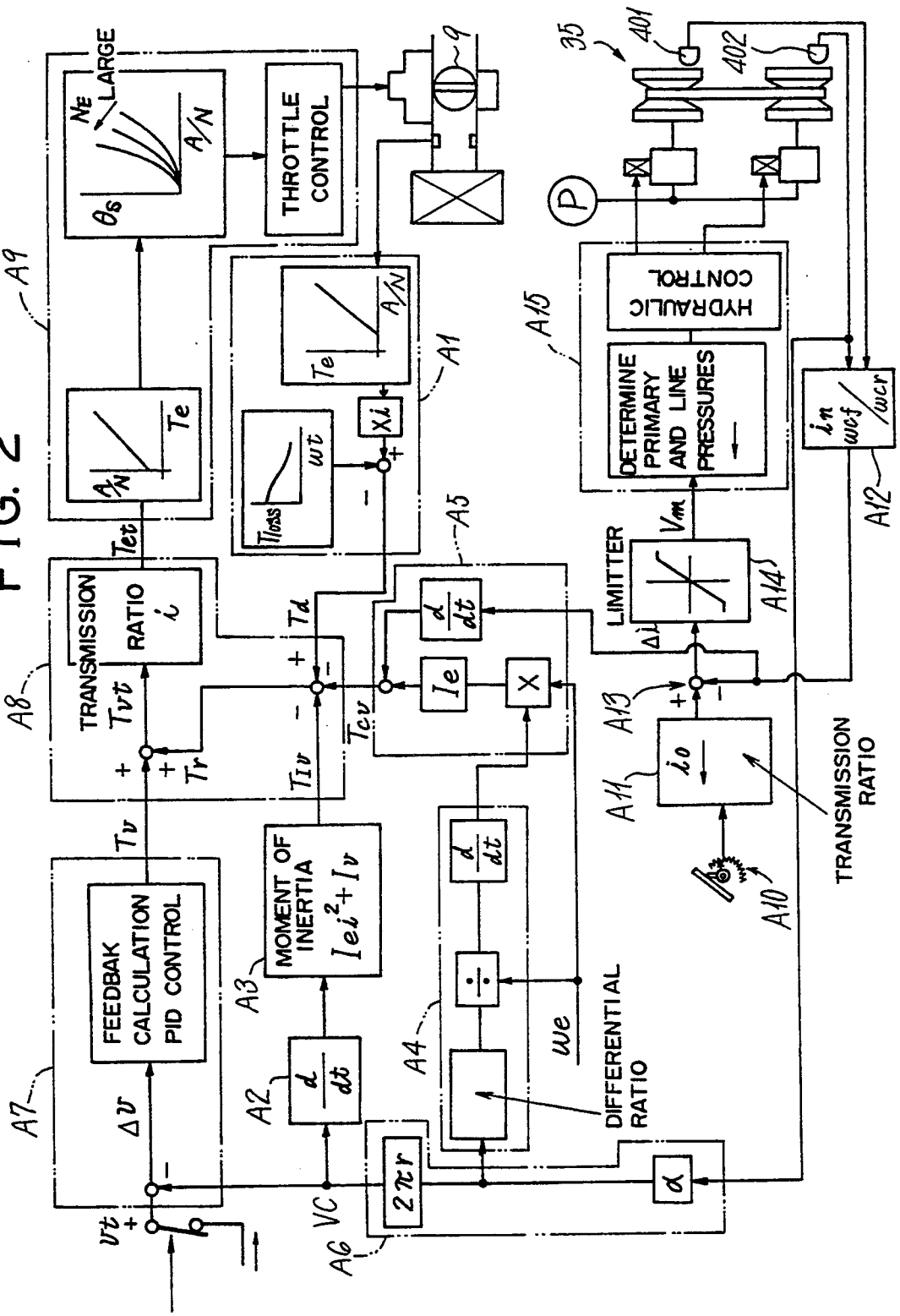
FIG. 2 is a functional block diagram of an electronic control device applied to the device illustrated in FIG. 1 of the present invention.

FIG. 1 shows a schematic diagram of a gasoline engine system (hereinafter, referred simply as an engine system) and a power transmission system P, which utilizes a control device according to the present invention. FIG. 2 shows a block diagram of the control device internal combustion engine and a continuously variable transmission according to the present invention.

The present invention basically controls both the engine E mounted on a vehicle and the continuously variable transmission (CVT) 35 which is disposed in the power transmission system P between the engine E and driving wheels 32 and of which transmission ratio i can be continuously changed. Particularly, the present invention comprises: driving torque detecting means A1 for detecting driving torque Td applied to the vehicle; acceleration detecting means A2 for detecting actual acceleration (dv/dt) of the vehicle; driving torque correcting amount setting means A3 for setting a driving torque correcting amount $T_{IV}$ as a first running resistance of the vehicle in accordance with the acceleration (dv/dt); transmission ratio changing speed detecting means A4 for detecting transmission ratio changing speed which is a changing rate of the transmission ratio i for the continuously variable transmission 35; transmission torque fluctuation correcting amount setting means A5 for setting a transmission torque fluctuation correcting amount Tcv which corresponds to torque (i.e. a second running resistance) for the transmission operation of the continuously variable transmission 35 in accordance with the transmission ratio changing speed detected by the transmission ratio changing speed detecting means A4; vehicle speed detecting means A6 for detecting an actual vehicle speed vc; vehicle speed correcting torque setting means A7 for setting vehicle speed correcting torque Tv, which is necessary for eliminating a deviation Δv, between an objective vehicle speed vt for allowing the vehicle to be traveled at a constant speed and the actual vehicle speed vc detected by the vehicle speed detecting means; objective driving torque setting means A8 for setting objective driving torque Tet in accordance with the driving torque Td, the driving torque correcting amount $T_{IV}$, the transmission torque fluctuation correcting amount Tcv, and the vehicle speed correcting torque Tv; and output controlling means A9 for controlling output of the internal combustion engine in accordance with the objective driving torque Tet.

Thus, the objective driving torque Tet is set in accordance with the driving torque Td, the driving torque correcting amount $T_{IV}$, the transmission torque fluctuation correcting amount Tcv, and the vehicle speed correcting torque Tv. Thus, the output of the internal combustion engine can be controlled by means of the objective driving torque Tet. Accordingly, the objective driving torque Tet can be set by selectively applying the torque correcting amount depending on the driving conditions. Further, it is possible to control the internal combustion engine at the optimum output in accordance with the objective driving torque Tet. It is also possible to eliminate slip of the steel belt caused by excessive output and shock caused during the transmission operation and, thereby improving driving feelings.

Now, a whole structure of the engine system and the power transmission system P illustrated in FIG. 1 will be described below. The engine system comprises an electronically controlled injection four-cycle engine E and variable devices such as fuel injectors 1 by which fuel is sprayed and injected and spark plugs 2 for ignition are controlled by a DBWECU 3 which acts as electronic control means for the engine. In addition, the DBWECU 3 is connected to a CVTECU 21 which acts as the electronic control means for the continuously variable transmission (CVT) 35, and to a cruise control circuit 39. The cruise control circuit 39 comprises a constant speed switch and a release switch (not shown) arranged in front of a driver's seat (not shown). The cruise control circuit 39 can supply a constant speed command or release command and to the DBWECU 3 in response to the operation of these switches. Both ECUs 3 and 21 are connected with each other through a communication line to continuously send and receive signals therebetween.

The DBWECU 3 is connected to an actuator 11 for actuating a throttle valve 9 which serves as intake air flow adjusting means which is driven without being affected by the operation of an accelerator pedal 10 which serves as a driver-operable member. The CVTECU 21 is connected to a hydraulic actuator 23 for hydraulically controlling the transmission ratio changing speed of the continuously variable transmission 35.

An entire construction of the engine system will be described below along a direction in which the air flows.

An intake air taken through an air cleaner element 5 is subjected to an air flow sensor 6 of the Karman vortex type which acts as intake air flow detecting means to detect the air flow and is delivered to a throttle body 8 through a suction pipe 42. Inside of an air cleaner body 4, apparatus such as an atmospheric pressure sensor and an atmospheric temperature sensor are not shown disposed besides the air flow sensor 6 to determine data on the intake air such as an atmospheric pressure ap and an atmospheric temperature at, supplied to the DBWECU 3 in a well-known manner.

The intake air flow into the throttle body 8 is controlled by means of the throttle valve in a butterfly shape. The throttle valve 9 is not actuated by the accelerator pedal 10 stepped by the driver. It is actuated by the actuator 11 (in this embodiment, a stepping motor). In this embodiment, so called DBW (drive by wire) method is applied where the actuator 11 is controlled by the DBWECU 3. In FIG. 1, a reference numeral 12 represents a throttle position sensor (hereinafter, a throttle sensor) for supplying opening information relating to the throttle valve 9, and a detection signal thereof is supplied to the DBWECU 3.

The accelerator pedal 10 is connected to an accelerator opening sensor 13 of a potentiometer type which acts as acceleration requirement detecting means. The stepping amount θa of the accelerator pedal 10 is supplied to the DBWECU 3 after being converted to an electric signal as acceleration requirement information for a driver.

The intake air flowing into the throttle body 8 is delivered through a surge tank 14 to an intake manifold 15. The intake air flows to the downstream of the intake manifold 15, where the fuel is injected from the injector 1 controlled by the DBWECU 3. Thus, the intake air and the fuel become an air fuel mixture. The air fuel mixture is poured into a combustion chamber E3 by opening a suction valve E2 disposed in the engine E. The air fuel mixture is then ignited by using the spark plug 2 at or around a top dead center. After completion of the explosion/expansion stroke, the air fuel mixture is supplied into an exhaust manifold 16 of an exhaust path 20 as exhaust gas by opening an exhaust valve E4, and is sent through an exhaust gas purification system which is not shown. After the removal of toxic components, the exhaust gas is then discharged to the outside through a muffler (not shown). Reference numeral 24 represents an engine speed sensor for supplying engine speed information, reference numeral 43 represents a linear air fuel ratio sensor which provides air fuel ratio information on all air fuel ratio zones, reference numeral 44 represents a crank angle sensor for supplying engine crank angle information, reference numeral 45 represents a knocking sensor for supplying knocking information of the engine, and reference numeral 46 represents a water temperature sensor.

Figure 3:
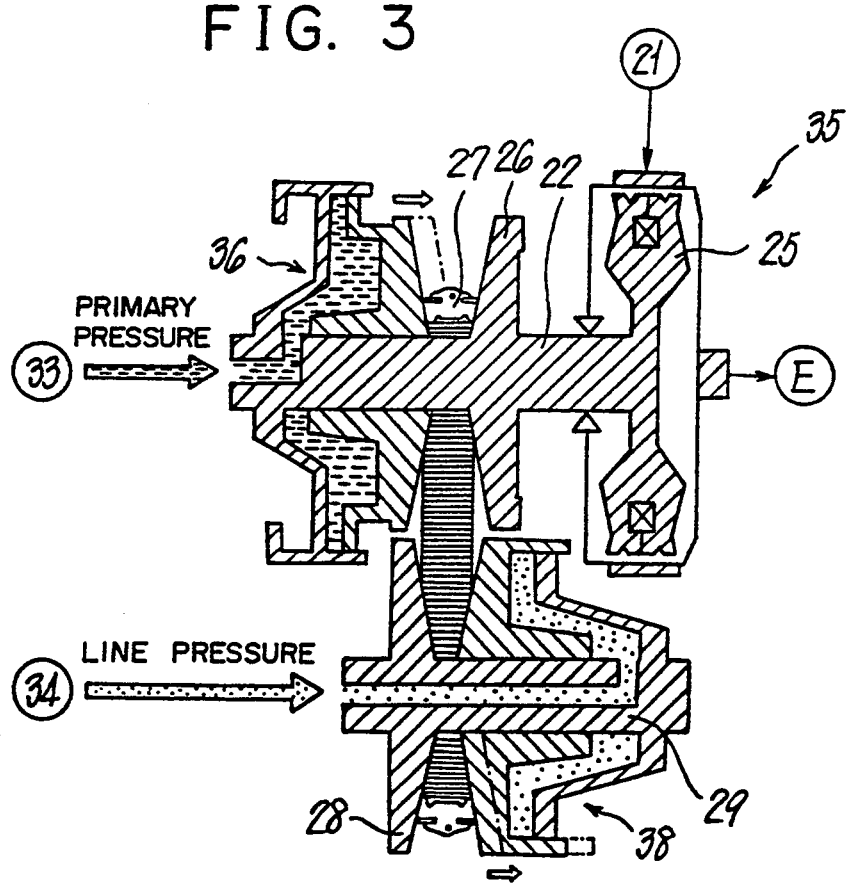
FIG. 3 is a sectional view of a continuously variable transmission applied to the device illustrated in FIG. 1.

On the other hand, the engine E is connected to the power transmission system P and also E is connected via a crankshaft, to the continuously variable transmission 35 illustrated in FIG. 3. An output shaft of an electromagnetic clutch 25 is coupled to a primary shaft 22 of the continuously variable transmission 35. The primary shaft 22 is united with a pair of primary pulleys stationary and movable pulleys 26 where a steel belt 27 passes through. The steel belt 27 passes between the primary pulleys 26 and a pair of secondary pulleys 28 (stationary and moveable pulleys). The secondary pulleys 28 are united with a secondary shaft 29. The secondary shaft 29 is constructed such that the turning effort is transmitted to driving wheels 32,32, which are coupled to a driving shaft 31, via a reduction gear train 30 and a differential gear which is not shown.

One of the primary pulleys 26 (i.e. movable pulley) serves as a part of a piston unit of a hydraulic actuator 36. A primary pressure is transmitted to the actuator 36 through a first solenoid valve 33 from a hydraulic source 37. Similarly, one of a pair of secondary pulleys 28 serves as a part of a piston unit of a hydraulic actuator 38. A line pressure is transmitted through a second solenoid valve 34 to the hydraulic source 37.

Therefore, the effective diameter of each pulley can be relatively changed according to the opening/closing ratio (duty ratio) of the first and the second solenoid valves 33 and 34, respectively. In this manner, the transmission ratio can be changed by means of changing engagement with the steel belt 27 to the pulleys.

Both solenoid valves 33 and 34 are constructed in such a manner that they can be operatively controlled in response to an output of the CVTECU 21. Reference numeral 40 represents a transmission ratio detecting sensor for supplying transmission ratio information of the continuously variable transmission 35. The transmission ratio detecting sensor 40 comprises a pair of rotary sensors 401 and 402 for detecting rotation speeds Wcf and Wcr of the primary pulleys 26 and the secondary pulleys 28, respectively, and an arithmetic unit 403 which calculates an actual transmission ratio in (=Wcf/Wcr). The output Wcr of the rotary sensor 402 of the secondary pulleys 28 is multiplied by a predetermined transmission ratio $\alpha$ to calculate an output shaft rotational speed $\omega c$, which serves as a vehicle speed sensor 48.

Now, each of the DBWECU 3 and the CVTECU 21, which acts as the electronic control means, is mainly implemented by a microcomputer. A memory circuit constituted therein memorizes and processes each control program such as the transmission ratio corresponding engine speed calculating map illustrated in FIG. 4, the torque calculating map illustrated in FIGS. 5 and 6, the engine output control processing routine illustrated in FIGS. 7 and 8, the running resistance estimating routine illustrated in FIG. 9, the CVT control processing routine illustrated in FIG. 10, and the main routine of the DBWECU 3 illustrated in FIG. 11.

The DBWECU 3 and the CVTECU 21 comprise: the driving torque detecting means A1 for detecting driving torque Td applied to the vehicle in accordance with the intake air flow A/N of the internal combustion engine and the transmission ratio i of the continuously variable transmission; acceleration detecting means A2 for detecting actual acceleration (dv/dt) of the vehicle; driving torque correcting amount setting means A3 for setting a driving torque correcting amount $T_{IV}$ as a first running resistance of the vehicle in accordance with the acceleration (dv/dt); transmission ratio changing speed detecting means A4 for detecting transmission ratio changing speed which is a changing rate of the transmission ratio i of the continuously variable transmission 35; transmission torque fluctuation correcting amount setting means A5 for setting a transmission torque fluctuation correcting amount Tcv as a second running resistance which is consumed for the transmission operation of the continuously variable transmission 35 in accordance with the transmission ratio changing speed (di/dt), and setting Tcv to zero when the continuous variable transmission is not in the transmission operation; vehicle speed detecting means A6 for detecting actual vehicle speed vc; vehicle speed correcting torque setting means A7 for setting vehicle speed correcting torque Tv, which is necessary for eliminating the deviation $\Delta v$ between an objective vehicle speed vt for allowing the vehicle to be traveled at constant speed and the actual vehicle speed vc detected by the vehicle speed detecting means; objective driving torque setting means A8 for setting objective driving torque Tet in accordance with the driving torque Td, the driving torque correcting amount $T_{IV}$, the transmission torque fluctuation correcting amount Tcv and the vehicle speed correcting torque Tv when the continuously variable transmission is on transmission and setting objective driving torque Tet in accordance with the driving torque Td, the driving torque correcting amount $T_{IV}$ and the vehicle speed correcting torque Tv substantially without using the transmission torque fluctuation correcting amount Tcv when the continuously variable transmission is not in the transmission operation because the transmission torque fluctuation correcting amount Tcv is set to zero by the transmission torque fluctuation correcting amount setting means A5; and output controlling means A9 for controlling the output of the internal combustion engine in accordance with the objective driving torque Tet.

Particularly in this embodiment, the control device further comprises: operational amount detecting means A10 for detecting an operational amount $\theta a$ of the driver-operable member for operating intake air flow adjusting means disposed in the suction system of the internal combustion engine; objective transmission ratio setting means A11 for setting an objective transmission ratio io in accordance with the operational amount $\theta a$; transmission ratio detecting means A12 for detecting an actual transmission ratio in (=Wcf/Wcr) by means of the rotational speeds (Wcf, Wcr) of both pulleys in the continuously variable transmission 35; transmission ratio deviation calculating means A13 for calculating a deviation $\Delta i$ between the objective transmission ratio io and the actual transmission ratio in; objective transmission ratio changing, speed setting means A14 for setting objective transmission ratio changing speed Vm in accordance with the transmission ratio deviation $\Delta i$; and transmission controlling means A15 for controlling the continuously variable transmission 35 to perform the transmission operation at the objective transmission ratio changing speed Vm.

Description will be made below regarding the control device for the internal combustion engine and the continuously variable transmission illustrated in FIGS. 1 and 2 in conjunction with the control programs illustrated in FIGS. 7 through 11.

In this embodiment, controls in the DBWECU 3 and the CVTECU 21 illustrated in FIG. 1 are carried out in operation when the engine system E is driven by operating an ignition key which is not shown.

Figure 11:
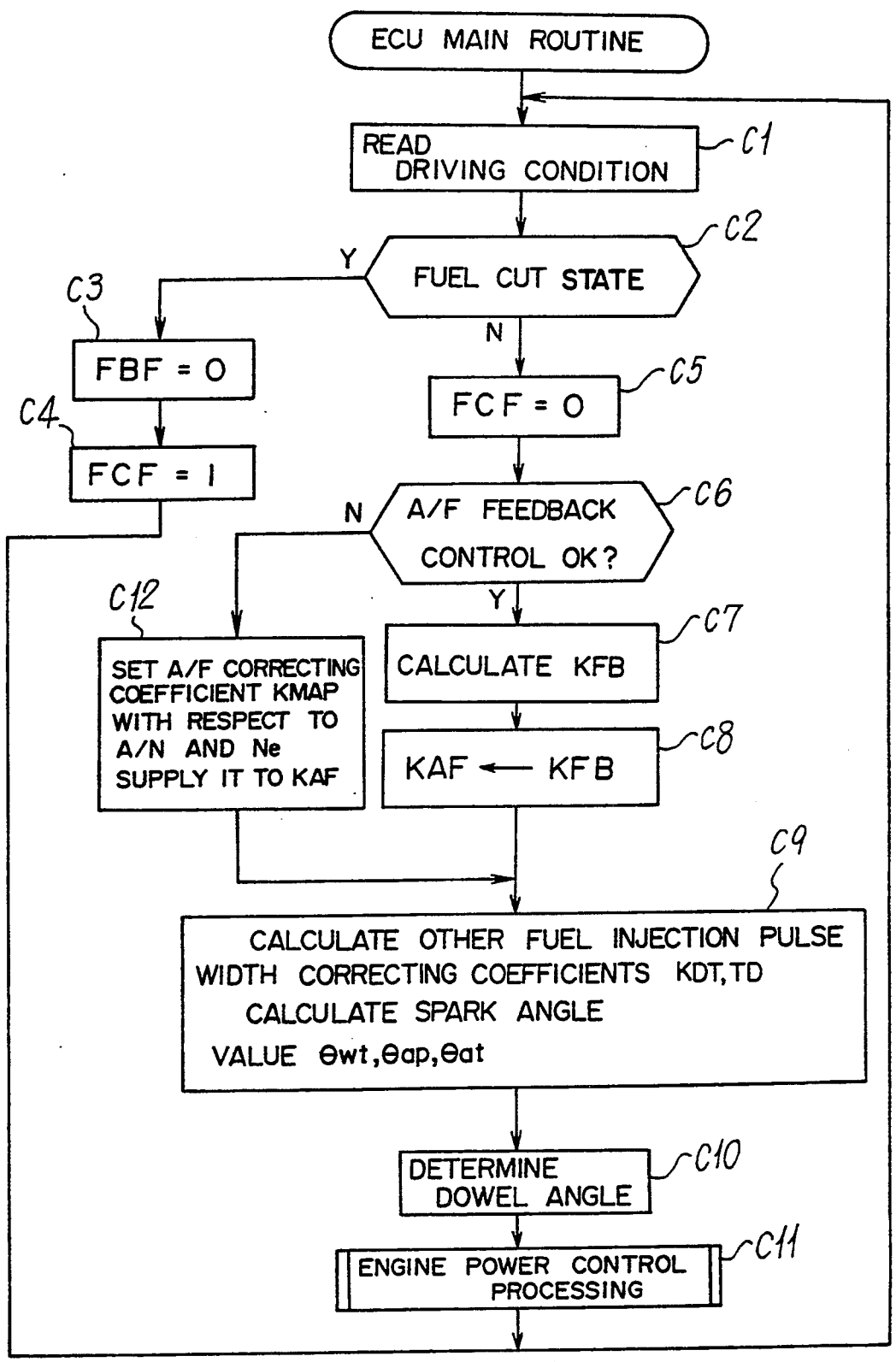
FIG. 11 is a flow chart of a main routine carried out by the control device illustrated in FIG. 1.

As the control is started, the DBWECU 3 carries out a main routine illustrated in FIG. 11. At the beginning of the main routine, initialization operation which is not shown is carried out at step c1 to read data detected by the sensors and store them in a predetermined area.

Step c2 determines whether or not fuel cut is mainly carried out in the engine on the basis of an engine speed Ne and engine load information (the intake air flow A/N in this embodiment). If the fuel-cutting is in progress, the control passes to step c3 to clear an air fuel feedback flag FBF. A fuel cut flag FCF is set to 1 at step c4. Thereafter, the control returns to the step c1.

When the fuel-cutting is not performed, the control passes to steps c5 and c6. The fuel cut flag FCF is reset, and whether or not a well-known air fuel ratio feedback control condition is satisfied is determined. When this condition is not satisfied due to, for example, a transient driving state such as a power driving state of the engine, an air-fuel ratio correcting coefficient KMAP is calculated at step c12 depending on the current driving conditions (A/N, Ne). This value is stored in an address KAF. Then, the control passes to step c9.

When step c7 is carried out because the air-fuel ratio feedback control condition is satisfied, a correcting value KFB is calculated in accordance with the feedback control constant and data supplied from the air fuel ratio sensor 43.

The value KFB is stored in the address KAF and the control process proceeds to the step c9. At the step c9, a fuel injection pulse width correcting coefficient KDT and a dead time correcting value TD for the fuel injection valve are set according to the driving condition. In addition, various correcting values are calculated so as to determine a spark timing θadv by using the following equation (1). Then, the control passes to step c10.

$$\theta adv = \theta b + \theta wt + \theta ap + \theta at + \theta ret \quad (1)$$

The collected values are a water temperature correcting value θwt to advance the spark timing depending on the decrease of the water temperature, and atmospheric pressure correcting value θap to advance the spark timing depending on the decrease of the atmospheric pressure, and an intake air temperature correcting value θat to advance the spark timing depending on the decrease of intake air temperature. These correcting values are stored in the predetermined area.

Figure 12:
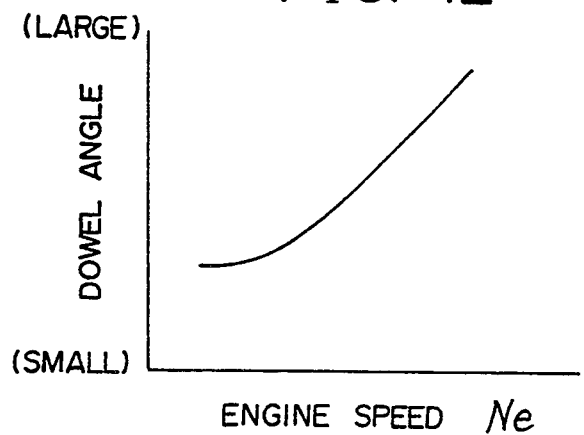
FIG. 12 shows a characteristic curve of a dowel angle calculating map for use in output control carried out by the control device illustrated in FIG. 1.

At step c10, a dowel angle is determined by using, for example, a map illustrated in FIG. 12 in such a manner that it increases as the engine speed Ne increases.

Thereafter, an engine output control processing is carried out at step c11, and then the control returns to the step c1.

Figure 7:
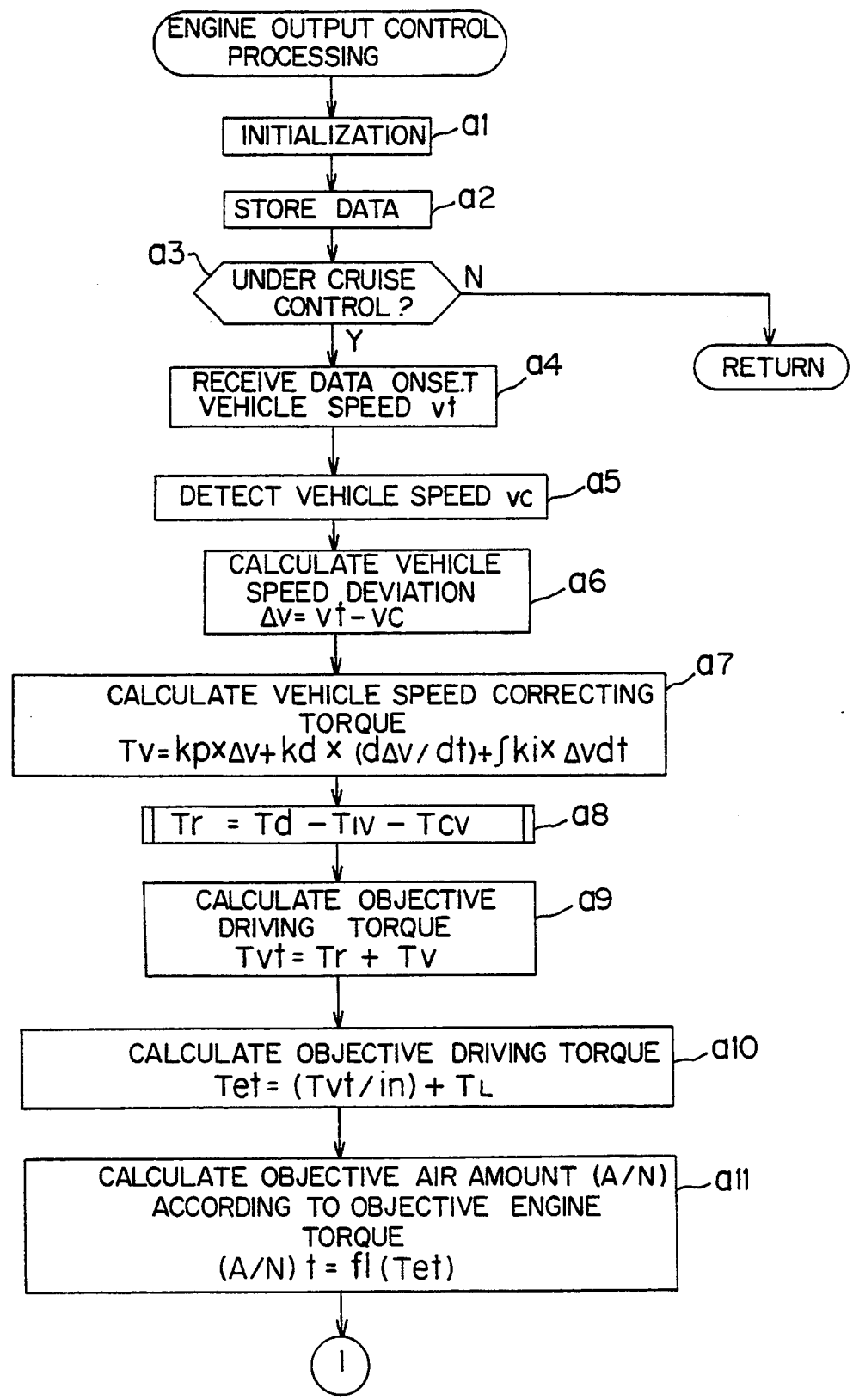
FIG. 7 is a flow chart representing an engine output control processing routine carried out by the device illustrated in FIG. 1.
Figure 8:
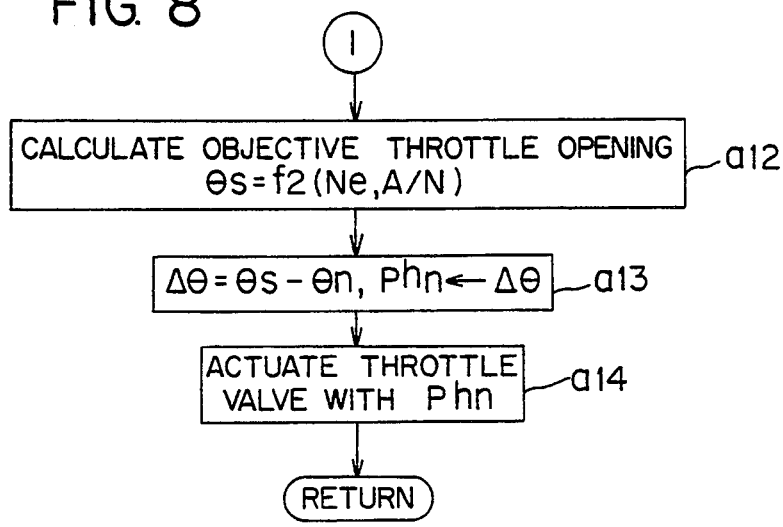
FIG. 8 is continuation of FIG. 7.

In FIG. 7, the engine output control processing carried out at the step c11 is illustrated. Step a1 carries out initialization operation. At step a2, data such as the accelerator opening θa and the engine speed Ne are stored in the predetermined area.

Step a3 determines whether or not a signal indicative of the cruise control is supplied from the cruise control circuit 39. If no cruise control is in progress, the control returns to the main routine. Otherwise, the control goes to the step a4.

In step a4, the vehicle speed vt is determined in response to vehicle speed setting command supplied from the cruise control device, and is stored in a predetermined area. In addition, step a5 detects the actual vehicle speed vc, and step a6 calculates the vehicle speed deviation Δv (=vt−vc).

At step a7, a vehicle speed correcting torque Tv (=Kp×ΔV+Kd×(dΔV/dt)+∫KiΔVdt) is calculated by PID-processing the successively calculated vehicle speed deviation Δv and is stored in a predetermined area.

Figure 9:
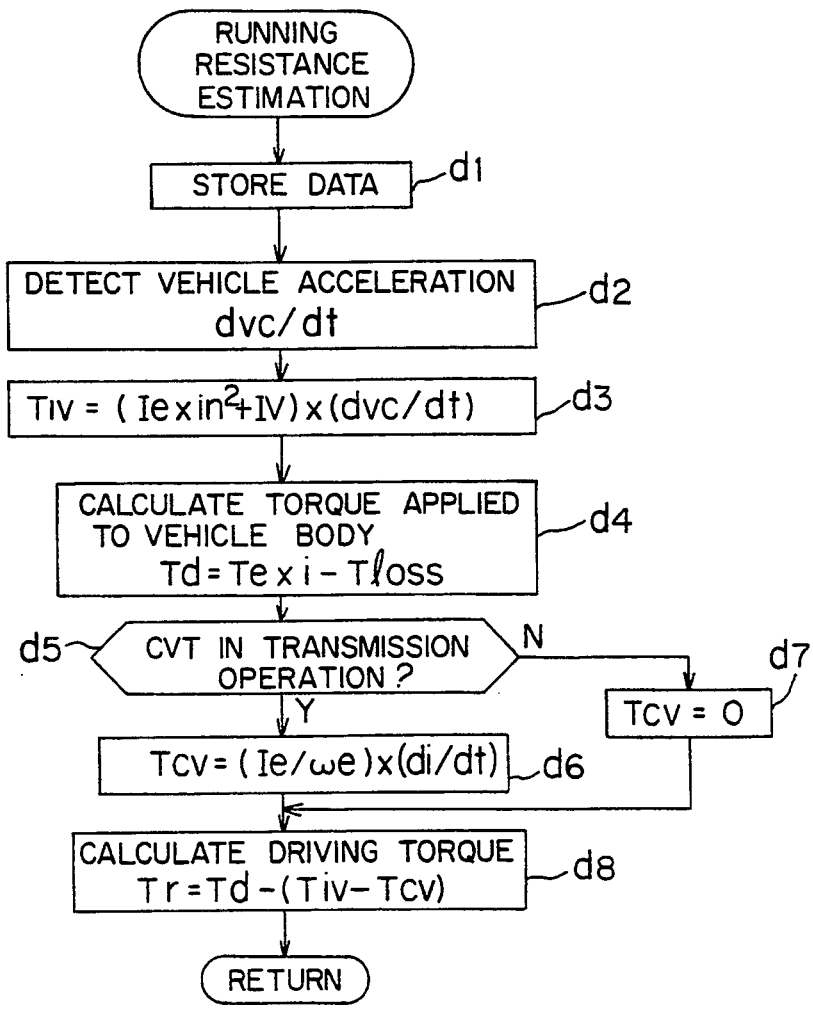
FIG. 9 is a flow chart of a running resistance estimating routine carried out by the device illustrated in FIG. 1.
Figure 10:
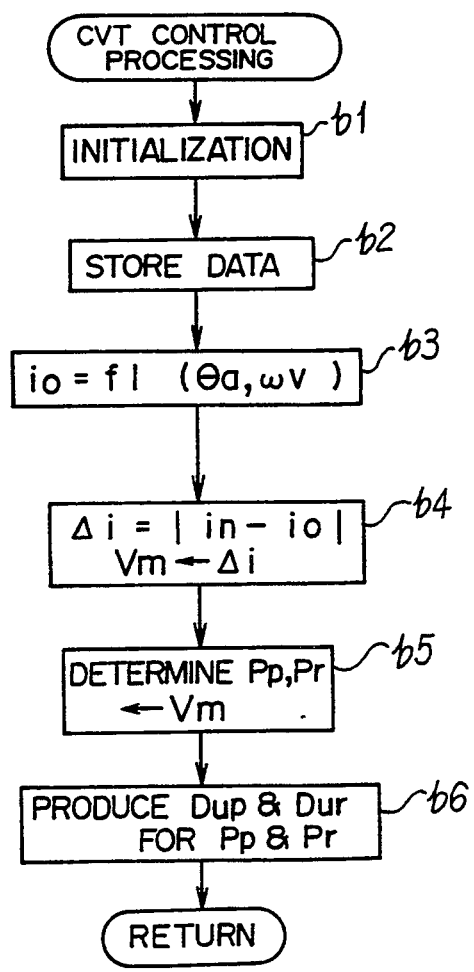
FIG. 10 is a flow chart of a CVT control routine carried out by the device illustrated in FIG. 1.

At step a8, the running resistance Tr is estimated by means of the running resistance estimating map illustrated in FIG. 9, and data such as the vehicle speed vc is stored at step d1.

Then, step d2 calculates the acceleration of the vehicle by differentiating the vehicle speed vc depending on the output shaft rotation angular velocity of the continuously variable transmission 35. Subsequently, the driving torque correcting value $T_{IV}$ (Ie×in²+Iv)×(dvt/dt)) is calculated at step d3 by the vehicle acceleration depending on the vehicle speed vc and is stored in a predetermined area, where Ie represents moment of inertia of the engine, Iv represents moment of inertia of the vehicle and i represents the transmission ratio.

Figure 5:
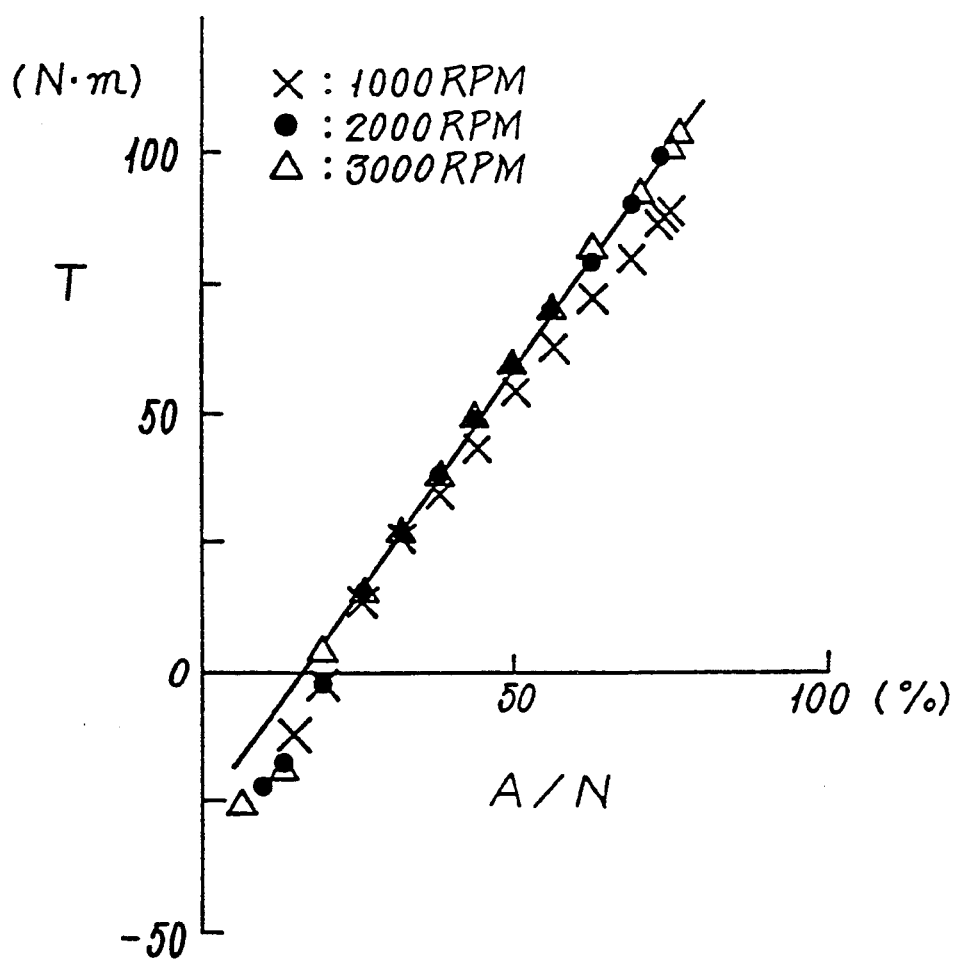
FIG. 5 shows a characteristic curve of an intake air flow/torque calculating map for use in output control carried out by the device illustrated in FIG. 1.

At step d4, the engine output torque Te is calculated on the basis of the intake air flow A/N by using the torque calculating map illustrated in FIG. 5. The engine output torque Te is multiplied by the transmission ratio i, from which the mechanical loss Tloss varying with a water temperature is subtracted to obtain the driving torque Td applied to the vehicle.

Step d5 checks whether or not the continuously variable transmission 35 is currently changing the transmission ratio thereof. If the transmission operation is not carried out, the control process passes to step d7. Otherwise, the control process goes to step d6. Whether or not the continuously variable transmission 35 is in the transmission operation is made by differentiating the output supplied from the arithmetic unit 403 for calculating the actual transmission ratio in (=wcf/wcr) and comparing with the threshold value din/dr.

When the differentiated value is smaller than the threshold value din/dr, the continuously variable transmission 35 is considered to be on the transmission operation. Then, the transmission torque fluctuation correcting amount Tcv is set to zero. On the other hand, when the differentiated value is larger than the threshold value din/dr, the transmission torque fluctuation correcting value Tcv (=(Ie×ωe)×di/dt) is calculated. Here, the transmission torque fluctuation correcting amount Tcv is a torque value which is considered to be consumed for transmission operation and is calculated. The transmission ratio changing speed di/dt is calculated by multiplying the rotation speed Wcr of the secondary pulley 28 by the predetermined transmission ratio and a differential ratio, and by differentiating the proportion of the rotation speed of the continuously variable transmission to the engine rotation speed ωe.

The transmission torque fluctuation correcting value Tcv is obtained as follows.

Figure 15:
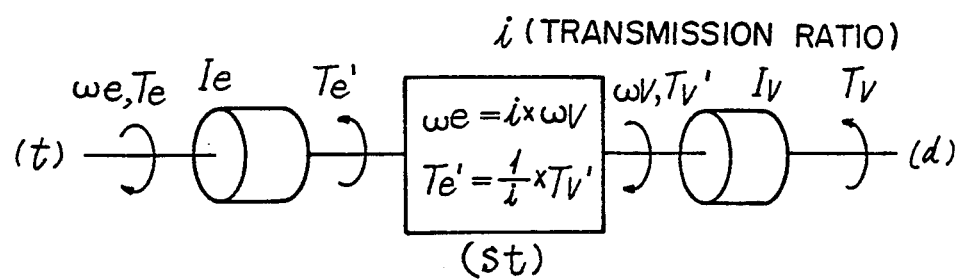
FIG. 15 is a schematic view of a dynamic model of the CVT illustrated in FIG. 1.

In the dynamic model of the CVT as illustrated in FIG. 15, the primary pulley 26 having the moment of inertia Ie is supplied with the torque Te at an angular velocity of we from a torque converter (t). Then, the torque Te is transmitted to the steel belt (st). The secondary pulley 28 having the moment of inertia Ic2 is supplied with the torque Tv at an angular velocity of ωv from the steel belt (st), and the torque Tv is transmitted to the output side (d) of the CVT. In this way, the torque Te is inputted, and the torque Tv is outputted through the belt (st) between both pulleys when the transmission ratio i is being changed. The kinetic equations for the primary and secondary pulleys are:

$$Ie \times (d\omega e/dt) = Te - Te' \quad (2)$$

$$Iv \times (d\omega v/dt) = Tv' - Tv \quad (3)$$

In this event, $d\omega e/dt = d(i \times \omega v)/dt = (di/dt) \times \omega v + i \times (d\omega v/dt)$, and $Te' = (1/i) \times Tv'$ can be obtained, and the results are re-written by the equation (2), namely, $$Ie \times (di/dt) \times \omega v + i \times Ie \times (d\omega v/dt) = Te - (1/i) \times Tv' \quad (2)'$$

The equation (2)' is multiplied by i, and added to both sides of the equation (3). Further, when the resultant equation is rearranged in consideration of $\omega e = 1 \times \Delta V$, $$d\omega v/dt = (i \times Te - Tv)/(Iv + i^2 \times Ie) - (Iex(di/dt) \times \omega e)/(Iv + i^2 \times Ie) \quad (4)$$

can be obtained.

As well known in the art, the transmission ratio changing speed di/dt can be controlled by changing the hydraulic pressure P applied to the pulleys. Accordingly, the following equation is obtained, $$di/dt = f(p), \quad imin \leq i \leq imax$$

where the torque Tv of the output shaft (d) of the CVT obtained by the equation (4) is substituted by transmission torque $T_{RL}$ transmitted by the transmission and torque corresponding to the loss $T_L$ consumed by the transmission, namely, $$d\omega e/dt (i \times Te - T_{RL} - T_n)/(Ie \times i^2 + Iv) - (- (di/dt) \times 107 \, e)/(Ie \times^2 = Iv),$$

where the second term represents the torque value depending on a variation of the transmission ratio changing speed di/dt. The transmission correcting torque $\Delta Te$ (corresponding to the transmission torque fluctuation correcting amount Tcv) which can be corrected so as to eliminate the variation of the torque consumed for the transmission ratio changing operation is:

$$(i \times \Delta Te)/(Ie \times i^2 + Iv) - ((di/dt) \times Ie \times \omega e)/(Ie \times i^2 + Iv) = 0,$$
thereby,
$i \times \Delta Te = (di/dt) \times Ie \times \omega e.$
Accordingly,
$$\Delta Te = (1/i) \times (di/dt) \times Ie \times \omega e \quad (5)$$
$$= (1/i) \times Vm1 \times Ie \times Ne \quad (5)'$$
and $di/dt = Vm1 = i \times (1/(Ie \times \omega e)) \times \Delta Te \quad (6)$ can be obtained, where $\omega e$ corresponds to the engine rotation speed.

At step d8, the driving torque Tr is calculated by subtracting the vehicle driving torque correcting amount $T_{IV}$ and the transmission torque fluctuation correcting amount Tcv (as the running resistance values) from the driving torque Td and is stored in a predetermined area. Then, the control process returns to the main routine.

When step a8 is followed by step a9 in FIG. 7, a temporary objective driving torque Tvt is calculated by adding the vehicle speed correction torque Tv to the driving torque Tr. In addition, at step a10, the temporary objective driving torque Tvt is divided by the transmission ratio in, and the estimated mechanical loss $T_L$ is added thereto to calculate the objective driving torque Tet. Further, at step a11, the intake air flow (A/N)t corresponding to the objective engine torque Tet is calculated by using a map similar to that illustrated in FIG. 5. Then the control passes to step a12.

Figure 6:
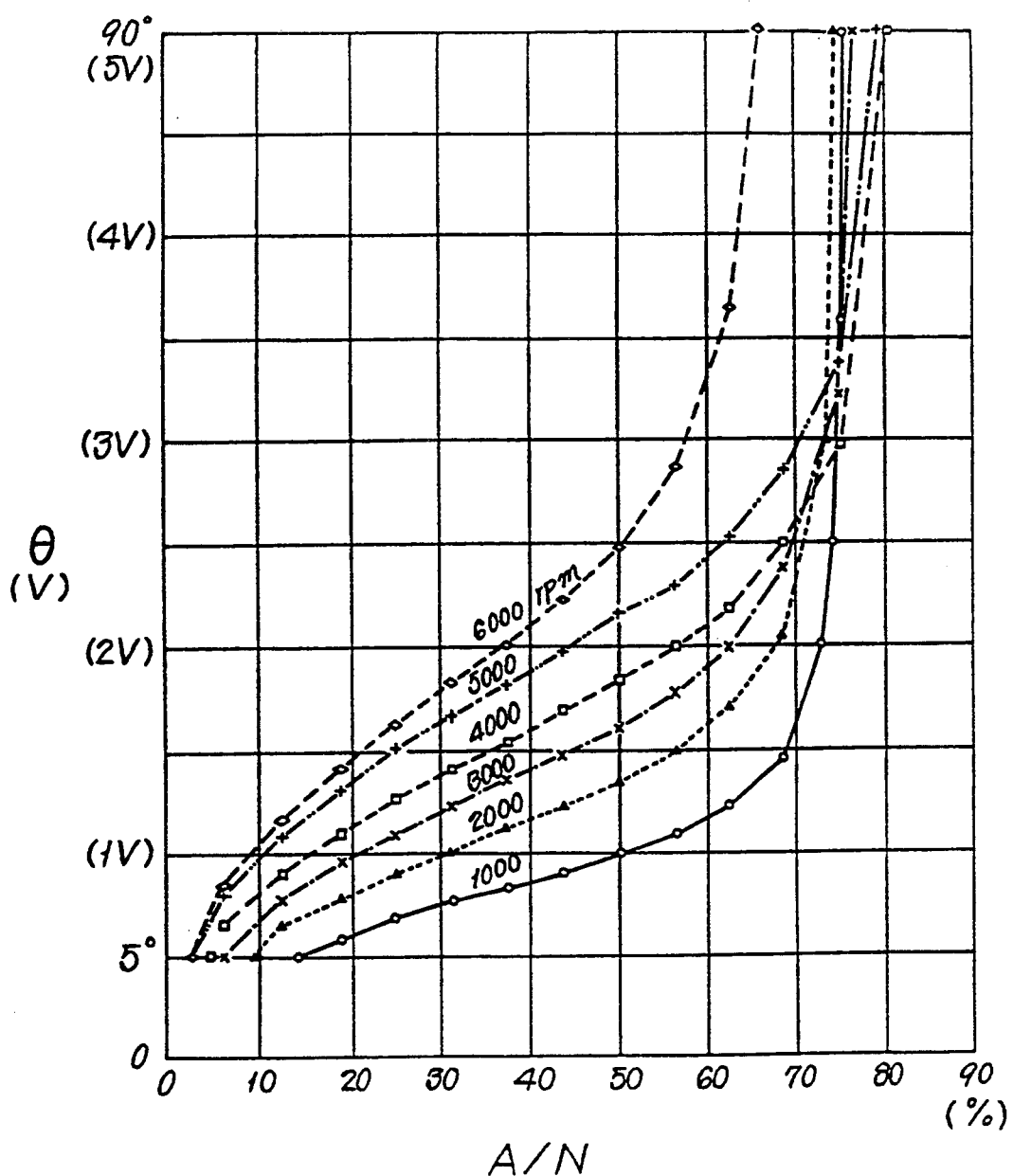
FIG. 6 shows a characteristic curve of a throttle valve (accelerator) opening/intake air flow calculating map for use in the output control carried out by the device illustrated in FIG. 1.

At step a12, an objective throttle opening $\Delta s$ is calculated with respect to the intake air flow (A/N)t and the engine speed Ne by using the throttle valve (accelerator)/intake air flow calculating map illustrated in FIG. 6. The subsequent step a13 calculates a deviation $\Delta \leftarrow$ by calculating a difference between the objective throttle opening $\theta s$ and the actual opening $\theta n$ to calculate a control amount Phn (i.e. a duty ratio of a pulse signal) with which the deviation $\Delta \leftarrow$ can be eliminated. At step a14, the throttle valve 9 is actuated by supplying the control amount Phn to the pulse motor 11. In this way, the objective driving torque Tvt is generated in the engine.

The CVTECU 21 carries out the CVT control routine illustrated in FIG. 9. Step b1 carries out initialization. Step b2 reads data obtained by the sensors such as the vehicle speed Vc, the throttle valve opening $\theta a$ and the actual transmission ratio in to store them in a predetermined area.

Figure 4:
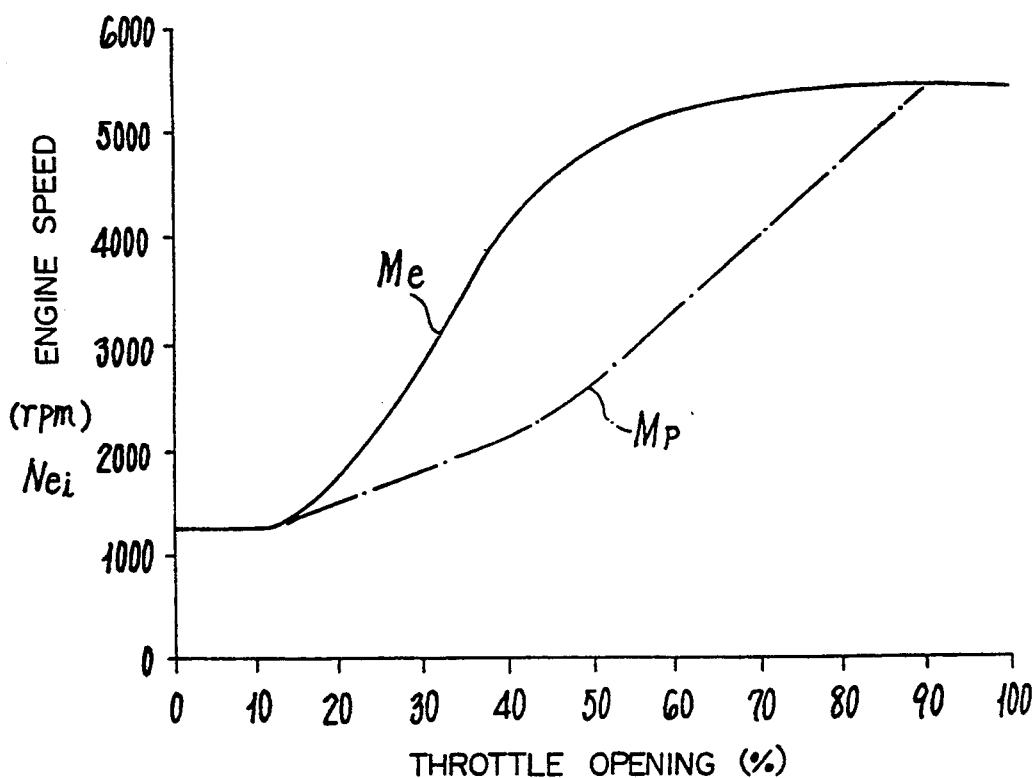
FIG. 4 shows a characteristic curve of a transmission ratio corresponding engine speed calculating map for use in output control carried out by the device illustrated in FIG. 1.
Figure 13:
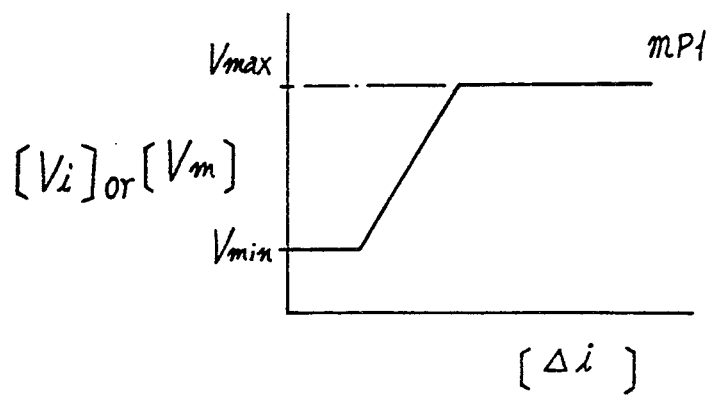
FIG. 13 is a characteristic curve of an i/transmission speed calculating map for use in the output control carried out by the control device illustrated in FIG. 1.

At steps b3 and b4, the engine speed Nei corresponding to the objective transmission ratio io is calculated based on the actual throttle opening $\theta a$ by using the map illustrated in FIG. 4. The objective transmission ratio io is determined such that the engine speed Nei is maintained depending on an actual vehicle speed Vc. Thereafter, at the step b4, the transmission ratio deviation $\Delta i$ between the actual transmission ratio in and the objective transmission ratio io is calculated. Further, the transmission ratio changing speed Vm corresponding to the value $\Delta i$ is calculated so as to be between the minimum and maximum values Vmin and Vmax according to the transmission ratio changing speed calculating map mp1 illustrated in FIG. 13.

Figure 14A:
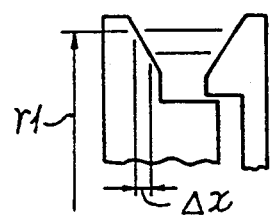
FIG. 14(a) is a schematic view of a part of an operational model representing a pulley portion in the CVT of the device illustrated in FIG. 1.
Figure 14B:
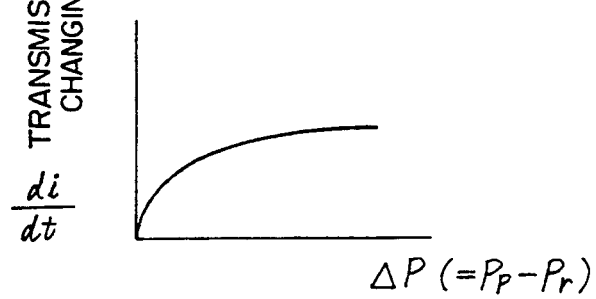
FIG. 14(b) shows a characteristic curve of a hydraulic pressure/transmission ratio changing speed calculating map for the device illustrated in FIG. 1.

At step b5, the primary pressure Pp and the line pressure Pr corresponding to the transmission ratio changing speed are determined for the decided transmission ratio changing speed Vm by using a map (see FIG. 14(b)) (in particular, this embodiment is designed so as to continuously apply constant line pressure Pr to the secondary pulley 28).

As shown in FIG. 14(a), the effective diameter r1 is considered as being directly proportional to the shift amount $\Delta x$ ($= (1/S) \times \int Qdt$, where 1/S represents a proportional constant) of the pulley in the continuously variable transmission 35. Additionally, the transmission ratio changing speed Vm ($= di/dt$) corresponding to the variation of the transmission ratio i is considered as being directly proportional to the variation of the effective diameter r1 of the pulley (dr1/dt). Accordingly, the following equation (7) can be derived from the proportional relations, $$d(\Delta x)/dt = 1/(S \times Q) = (1/S) \times \sqrt{k \Delta p} \quad (7)$$

By using this equation (7), the diagram as illustrated in FIG. 14(b) can be obtained.

In FIG. 14(b), $\Delta p$ (primary pressure Pp) is considered to represent a pressure difference (which is proportional to the fuel flow) in a feeding path of the hydraulic chamber of the pulley. The primary pressure Pp is determined in accordance with the transmission ratio changing speed Vm (di/dt).

The control process passes to step b6 to set duty ratios Dup and Dur to maintain the primary and line pressures Pp and Pr. The first and the second solenoid valves 33 and 34 are controlled by these duty ratios, so that the actual transmission ratio in of the continuously variable transmission 35 approaches to the objective transmission ratio io. As mentioned above, according to the present invention, it is possible to precisely control the vehicle speed during the constant speed under the cruise control. Further, it is possible to prevent sudden change of the transmission ratio. This results in elimination of shock and slip of the steel belt 27 caused by overpower.

As described above, the present invention basically sets the objective driving torque Tet in accordance with the driving torque Td, the vehicle driving torque correcting amount $T_{IV}$, the transmission torque fluctuation correcting amount Tcv, and the vehicle speed correcting torque Tv. In addition, the output of the internal combustion engine is controlled with the objective driving torque Tet. Accordingly, the objective driving torque Tet can be set by selectively applying the torque correcting amount depending on the driving conditions. It is possible to control the internal combustion engine at an optimum power for the objective driving torque Tet. Further, it is possible to eliminate slip of the steel belt caused by excessive output and a shock caused by the transmission operation. Particularly, when the vehicle has a cruise control device, it is possible to reduce transmission shock of the continuously variable transmission during operation of this device, thereby improving driving feelings.

The driving torque Td applied to the vehicle is detected on the basis of the intake air flow A/N of the internal combustion engine, and the transmission ratio i of the continuously variable transmission. The transmission torque fluctuation correcting amount Tcv can be controlled in accordance with the transmission ratio changing speed Vm (di/dt) when the continuously variable transmission is in the transmission operation. Conversely, Tcv is set to zero when the continuously variable transmission is not in the transmission operation. Further, the objective driving torque Tet can be set in accordance with the driving torque Td, the vehicle driving torque correcting amount $T_{IV}$ and the vehicle speed correcting torque Tv substantially without using the transmission torque fluctuation correcting amount Tcv when the continuously variable transmission is in the transmission operation. The aforementioned structure contributes to improving the controllability.

Furthermore, it is possible to change the continuously variable transmission to a transmission ratio suitable for the driving condition and to improve the driving feelings when the control device further includes: operational amount detecting means A10 for detecting the operational amount $\theta a$ of the driver-operable member for operating the intake air flow adjusting means; objective transmission ratio setting means A11 for setting the objective transmission ratio io in accordance with the operational amount $\theta a$; transmission ratio detecting means A12 for detecting the actual transmission ratio in of the continuously variable transmission, transmission ratio deviation calculating means A13 for calculating the deviation $\Delta i$ between the objective transmission ratio io and the actual transmission ratio in; objective transmission ratio changing speed setting means A14 for setting the objective transmission ratio changing speed Vm in accordance with the transmission ratio deviation $\Delta i$; and transmission controlling means A15 for controlling the continuously variable transmission into the objective transmission ratio changing speed Vm.

Industrial Application Field

As mentioned above, in the control device for the internal combustion engine and the continuously variable transmission according to the present invention, the continuously variable transmission can be changed at adequate transmission ratio changing speed. In addition, the internal combustion engine can be controlled at the adequate output in consideration with output loss caused during transmission ratio changing operation of the continuously variable transmission. Accordingly, it is possible to reduce slip caused by the transmission ratio changing operation and transmission shock caused in the continuously variable transmission. Further, the present invention is effectively applicable to the driving system where the driving feeling is an important factor. The effect thereof is well exhibited.

We claim:

1. A control device for controlling an internal combustion engine and a continuously variable transmission of a vehicle, said continuously variable transmission transmitting power between the internal combustion engine and driving wheels, and having a continuously changeable transmission ratio, said control device comprising:

driving torque detecting means for detecting driving torque applied to the vehicle;

transmission ratio changing speed detecting means for detecting transmission ratio change speed which is a changing rate of the transmission ratio of said continuously variable transmission;

transmission torque fluctuation correcting amount setting means for setting a transmission torque fluctuation correcting amount as a first running resistance which is consumed for the transmission operation of said continuously variable transmission in accordance with the transmission ratio changing speed detecting by said transmission ratio changing speed detecting means;

vehicle speed detecting means for detecting an actual speed of said vehicle;

vehicle speed correcting torque setting means for setting vehicle speed correcting torque, which is necessary for eliminating a deviation between an objective vehicle speed for allowing the vehicle to be traveled at a constant speed and the actual vehicle speed detected by said vehicle speed detecting means, in accordance with said deviation;

objective driving torque setting means for setting objective driving torque in accordance with the driving torque detected by said driving torque detecting means, the transmission torque fluctuation correcting amount set by said transmission torque fluctuation correcting amount setting means, and the vehicle speed correcting torque set by said vehicle speed correcting torque setting means; and output controlling means for controlling output of said internal combustion engine in accordance with the objective driving torque set by said objective driving torque setting means.

2. The control device as claimed in claim 1, wherein said transmission torque fluctuation correcting amount setting means sets the transmission torque fluctuation correcting amount in accordance with the transmission ratio changing speed detected by said transmission ratio changing speed detecting means when the continuously variable transmission is in the transmission operation mode, and sets said transmission torque fluctuation correcting amount to zero when said continuously variable transmission is not in the transmission operation mode.

3. The control device as claimed in claim 1 wherein said driving torque detecting means detects the driving torques applied to the vehicle in accordance with an intake air flow of said internal combustion engine and with the transmission ratio for said continuously variable transmission.

4. The control device as claimed in claim 1, wherein said output controlling means controls a throttle valve of said internal combustion engine in accordance with the objective driving torque set by said objective driving torque setting means.

5. The control device as claimed in claim 1 further comprising:

operational amount detecting means for detecting an operational amount of a driver-operable member for operating intake air flow adjusting means disposed in a suction system of said internal combustion;

objective transmission ratio setting for setting an objective transmission ratio for said continuously variable transmission in accordance with the operational amount detected by said operational amount detecting means;

transmission ratio detecting means for detecting an actual transmission ratio of said continuously variable transmission;

transmission ratio deviation calculating means for calculating a deviation between the objective transmission ratio set by said objective transmission ratio setting means and the actual transmission ratio detected by said transmission ratio detecting means;

objective transmission ratio changing speed setting means for setting objective transmission ratio changing speed in accordance with the transmission ratio deviation calculated by said transmission ratio deviation calculating means; and transmission controlling means for controlling said continuously variable transmission such that an actual transmission ratio changing speed achieves the objective transmission ratio changing speed set by said objective transmission ratio changing speed setting means.

6. The control device as claimed in claim 1 further comprising:

acceleration detecting means for detecting actual vehicle acceleration of the vehicle; and driving torque correcting amount setting means for setting a driving torque correcting amount a second running resistance of the vehicle in accordance with the acceleration detected by the acceleration detecting means.

7. The control device as claimed in claim 6, wherein said objective driving torque setting means sets the objective driving torque in accordance with the driving torque detected by said driving torque detecting means, the driving torque correcting amount set by said driving torque correcting amount setting means, and the vehicle speed correcting torque set by said vehicle speed correcting torque setting means without using the transmission torque fluctuation correcting amount set by said transmission torque fluctuation correcting amount setting means when said continuously variable transmission is not in the transmission operation mode.

* * * * *